(12) United States Patent
Harrison

(10) Patent No.: US 11,015,644 B2
(45) Date of Patent: May 25, 2021

(54) PINNED CYLINDRICAL ROLLER BEARING

(71) Applicant: EBT, Inc, Fort Worth, TX (US)

(72) Inventor: Curtis Harrison, Fort Worth, TX (US)

(73) Assignee: Engineered Bearing Technology, Inc., Ft. Worth, TX (US)

( * ) Notice: Subject to any disclaimer, the term of this patent is extended or adjusted under 35 U.S.C. 154(b) by 0 days.

(21) Appl. No.: 16/894,789

(22) Filed: Jun. 6, 2020

(65) Prior Publication Data

US 2020/0386265 A1    Dec. 10, 2020

Related U.S. Application Data

(60) Provisional application No. 62/858,494, filed on Jun. 7, 2019.

(51) Int. Cl.

| | |
|---|---|
| *F16C 13/02* | (2006.01) |
| *F16C 19/26* | (2006.01) |
| *F16C 43/06* | (2006.01) |
| *B23P 15/00* | (2006.01) |
| *F16C 33/52* | (2006.01) |

(52) U.S. Cl.
CPC ............ *F16C 13/02* (2013.01); *B23P 15/003* (2013.01); *F16C 19/26* (2013.01); *F16C 33/526* (2013.01); *F16C 43/06* (2013.01)

(58) Field of Classification Search
CPC ............................... F16C 33/526; F16C 19/26
USPC ........................................................... 384/574
See application file for complete search history.

(56) References Cited

U.S. PATENT DOCUMENTS

| | | | | |
|---|---|---|---|---|
| 2,017,186 | A | * 10/1935 | Rockwell | ............ F16C 33/4688 |
| | | | | 384/579 |
| 4,211,168 | A | * 7/1980 | Haep | ........................ F42B 8/12 |
| | | | | 102/444 |
| 2010/0209037 | A1 | * 8/2010 | Miyachi | .................. F16C 43/06 |
| | | | | 384/574 |

* cited by examiner

*Primary Examiner* — Sarang Afzali
(74) *Attorney, Agent, or Firm* — Ted Whitlock; Registered Patent Attorney PA

(57) ABSTRACT

A pinned roller bearing assembly having a plurality of pinned rollers, wherein each of the pins has a first threaded end received in a threaded aperture of a first support ring, and a second unthreaded and shouldered end received in a countersunk and unthreaded aperture of a second support ring. Each end of each pin extends through its respective support ring and is rivetingly domed outside the support ring to secure its position and configuration. The pinned roller bearings and support rings are disposed within an outer and inner race.

5 Claims, 10 Drawing Sheets

PINNED CYLINDRICAL ROLLER BEARING

BACKGROUND OF THE INVENTION

In traditional spherical or cylindrical roller bearings for use in mechanical pumps and other mechanical motors or engines, close-fitting machined cages, or races, were employed to align and guide rollers, thereby reducing skewing of the rollers. This traditional configuration for alignment and guidance of the rollers reduced the number of rollers that could be provided in the bearing, and thereby reduced the basic radial rating of the bearing. This traditional configuration also translated into axial loading on the roller generated by the bearing itself.

To reduce the axial load on the cylindrical roller, and to increase and optimize the number of rollers within the cage, a bearing was designed having a pin which extended through the axial center, or longitudinal midline, of the cylindrical roller, wherein the pin was affixed at each end to support rings of the cage assembly.

This "pinned roller" configuration became the conventional design for all roller bearings used in the industry. However, a major and persistent problem resulted from these conventional roller bearings using the pinned cylindrical roller configuration, namely, that the pinned roller bearings created axial load or amplified the existing axial load on the crankshaft of the pump motor. This amplification of the axial load resulted in the crankshaft being pushed in a corkscrew fashion, which ultimately drove the crankshaft out of the pump and causing failure of the pump.

The configuration and manufacture of the pinned roller bearings into a bearing assembly utilized either a cold-riveting process or were welded to hold the pins in place in the support ring. Cold riveting the pins into place in the bearing assembly has a tendency to bend the roller pin tip instead of creating a pin head. If a pin head is not created and the roller pin bends, then the components are no longer parallel or perpendicular to one another.

The heat generated in the welding process can warp the support ring, the pin, or the bearing race, thus altering the configuration of the bearing. Therefore, both the cold riveting and welding processes result in pin placement that is not precisely perpendicular to the alignment planes of the inner and outer races and parallel to one another, thus allowing the bearing to create or amplify the existing axial load in the pump.

What is needed in the art is a process and pinned roller bearing that provides pins that are precisely aligned parallel to one another, perpendicular to the planes of the inner and outer races, and remain so aligned during operation of the machine, such as a pump, in which the bearing is employed.

SUMMARY OF THE INVENTION

The subject invention concerns a pinned roller bearing assembly wherein each pin is uniquely configured to provide an advantage for operation of the bearing, as well as the machine in which the bearing is used.

A pin used in a pinned roller bearing of the invention has two ends, a first end received in a first support ring of a bearing assembly, and a second end received in a second support ring of a bearing assembly. Advantageously, each pin of the invention comprises a threaded portion at one of its first or second ends (a "threaded end"), and wherein the other end of the pin is not threaded (an "unthreaded" end). Preferably, the threaded portion of the pin extends no greater than, and preferably slightly less than, the width of the support ring of the bearing assembly into which it is received. More preferably, the threaded portion of the pin is provided at a distance away from the end of the pin so that the end portion of the pin, which is unthreaded, extends through and outside the corresponding support ring allowing for the end portion of the pin to be riveted into place in the support ring of the bearing. A preferred riveting process is "hot" riveting, which is well known in the art. Hot riveting can be advantageous in that the temperatures used in a hot riveting process are greater than used in a "cold riveting" process, but are less than temperatures used in a welding process.

One preferred embodiment of the subject invention concerns a pinned roller bearing assembly wherein the pin comprises a shoulder formed on one or both ends of the pin for countersinking the pin into the support ring, which is matingly configured to receive the shouldered pin. A preferred embodiment comprises a shoulder at each end of the pin, namely at the threaded end and at the unthreaded end.

This preferred embodiment of the invention therefore concerns a pinned roller bearing assembly wherein the pin comprises a threaded portion at one end, and the other end which is not threaded, as described above, and wherein the pin also comprises a shoulder formed therein for countersinking the pin into the support ring matingly configured to receive the shouldered pin. This configuration is illustrated in the accompanying drawings.

The support rings for the roller bearing assembly are configured to matingly receive the pin as it is configured, i.e., when the pin is threaded at one end, the bearing includes two support rings—one on each side of the bearing and forming generally flat, annular plate (or flat ring) between the inner and outer races of the bearing assembly. Each support ring comprises threaded apertures or holes formed therein to threadingly receive the threaded end of the pin. In the embodiment wherein the pin comprises a shoulder, the corresponding support ring portion comprises a countersink area for receiving and matingly engaging the shoulder formed in the pin.

Each of the first and second support rings in the bearing assemblies therefore comprises a set of holes equidistantly formed around its circumference to receive the ends of the pins. The threaded end of the pin is disposed into a threaded hole in the support ring, and the unthreaded end of the pin is disposed in an unthreaded hole in the support ring. The number of holes formed in each bearing assembly is equal to the number of pins and cylindrical bearings provided in the bearing; the number of pins and bearings being dictated by the size of the bearing assembly and circumference of the cylindrical roller used in the bearing assembly. The holes in the first and second support rings of the bearing assembly are formed so they are aligned with one another when assembled, and maintain the pins parallel to one another.

In one embodiment of the invention, each hole in a first support ring of a bearing assembly is threaded, and the threaded end of the pin is threadingly engaged with the threaded hole in the first support ring of the bearing assembly. In this embodiment, the holes in a second support ring of the bearing assembly are not threaded and engage the non-threaded end of the pin.

In a second embodiment of the invention, every other hole in the first support ring of the bearing assembly is threaded and the threaded end of the pins is threadingly engaged with these alternating (every other) threaded holes. In the second support ring of the bearing assembly, every other hole is also threaded, such that the threaded holes in the second support ring align with the unthreaded holes in the first bearing assembly, and vice versa. Thus, every other pin is threadingly engaged to the first support ring of the bearing assembly, and each pin proximate to those threadingly engaged in the first support ring are threadingly engaged to the second support ring of the bearing assembly. The unthreaded end of each pin is then hot riveted in place when the first and second races are assembled together to form the roller bearing. The threaded ends of the pins can also be hot-riveted onto the support ring to which it is threadingly engaged.

The alternating threaded hole configuration providing alternating threaded ends of the pins in the first and second support rings of the bearing assembly can provide advantages which include, but are not limited to: increased stability of the bearing, reduced skewing of the pins, reduced warping of a component of the bearing assemblies, reduced load on the other pump components, longer life for the bearing or pump, and the like.

The subject invention further comprises a method for manufacturing a pinned roller bearing comprising a pin having one threaded end and one non-threaded end for threadingly engaging a support ring of the roller bearding assembly having a threaded aperture in the support ring, a method for manufacturing a roller bearing pin having a shouldered configuration at one end or having a shouldered configuration at both ends for matingly countersinking and engaging a support ring in a roller bearing assembly, and a roller bearing comprising a roller bearing pin having one or more features of a threaded end and one or two shouldered ends.

In one embodiment of the invention, the roller pin is unthreaded at both ends, and comprises a shouldered configuration at both ends, wherein the shouldered, unthreaded pins are countersunk with a support ring of a bearing assembly and hot-riveted into position. The, although shouldered pins are known, the countersunk shouldered pins can provide an advantage during assembly of a roller bearing. Specifically, known shouldered bearings are not configured for countersinking with a support ring, and are only abutted to an outer surface of the support ring so the support ring and shouldered pin are in flush contact. By countersinking the shouldered pin with the support ring, the pins and rollers are more stably positioned during assembly and facilitate positioning of the pin and roller in a perpendicular position relative to the support ring.

The subject invention further includes a roller bearing pin and a pinned roller bearing manufactured by the method of the invention.

DETAILED DESCRIPTION OF THE INVENTION

Figure 1:
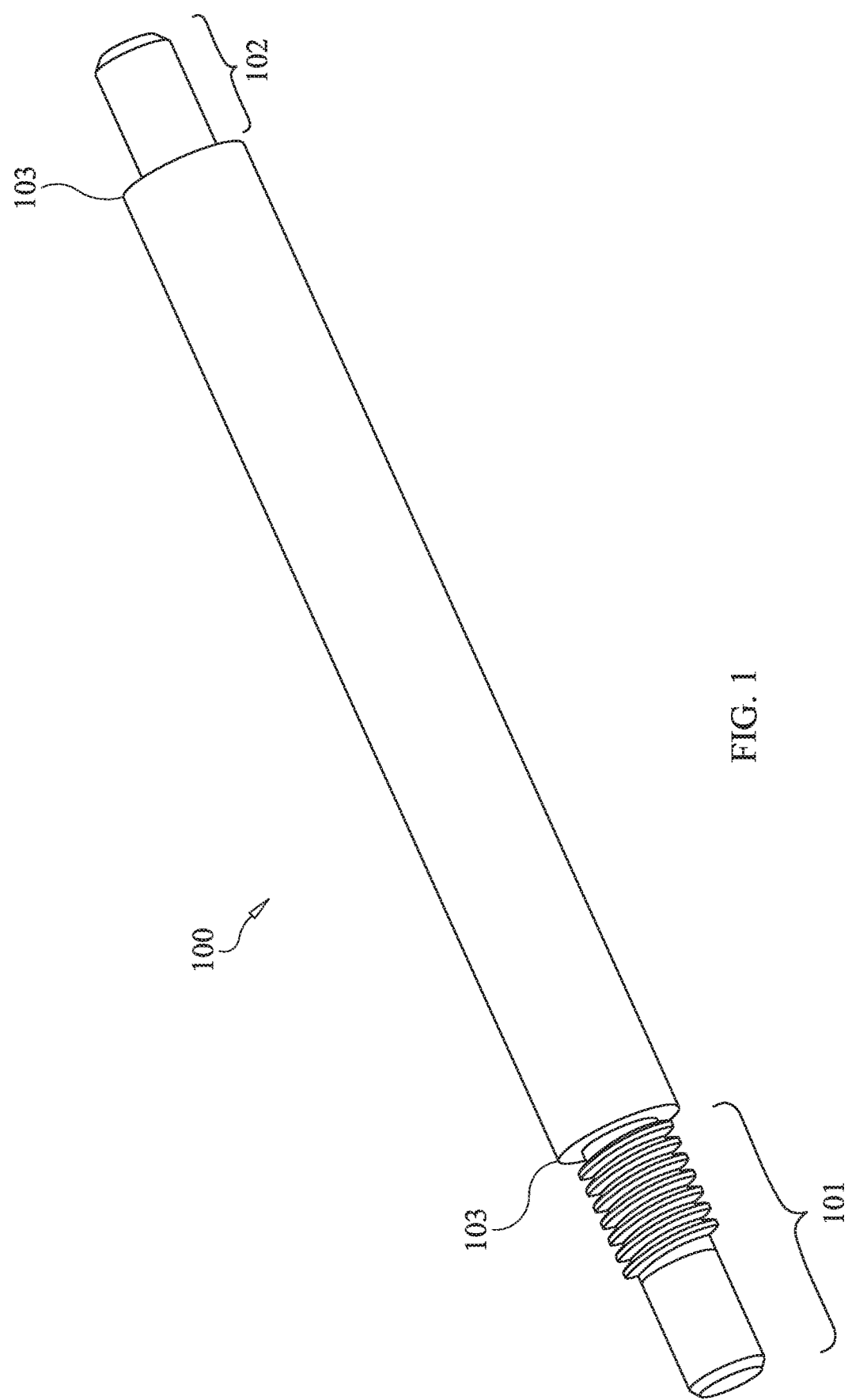
FIG. 1 is a perspective view of an embodiment of a roller bearing pin according to the subject invention, illustrating the threaded first end of the pin and a non-threaded second end of the pin, and further illustrating the shouldered configuration at both ends of the pin.

All roller bearings used for mechanical motors, such as pump motors, comprise a first (e.g., inner) and second (e.g., outer) circular race having cylindrical rollers disposed perpendicularly in relation to plane of the race. A traditional roller bearing comprises a cage machined to be close-fitting to align and guide the rollers to reduce skewing. Due to problems caused by axial forces on the rollers used in traditional roller bearings, improved (now conventional) roller bearings were manufactured to include pins disposed through the central longitudinal axis of the roller, and affixed to the cage by cold riveting or welding. These conventional pin roller bearings were also less than ideal because, although the axial forces on the rollers were reduced, forces were transferred to the bearing itself, or to the crankshaft, causing failure of the pump.

Unexpectedly, by threadingly engaging one end of a roller bearing pin to at least one of the two support rings disposed on each side of the bearing assembly, between the inner and outer races, the forces on the roller bearing are within the tolerable limits and pump failures are reduced. Accordingly, the subject invention comprises a roller bearing comprising a pinned roller where one end of the pin is threadingly engaged with one support ring of the bearing assembly, wherein the support ring comprises threaded apertures or holes to accept the threaded end of the pin.

Alternatively, each support ring can be threadingly engaged to a threaded end of the pin by forming alternating threaded apertures or holes in both support rings, wherein the threaded hole in one support ring is offset compared to the threaded holes in the other support ring, resulting in a configuration where alternating pins are threadingly engaged to the opposing support rings. For example, where threaded apertures are formed in odd-numbered holes 1, 3, 5, 7, etc. in a first support ring, threaded holes are formed in even-numbered holes 2, 4, 6, 8, etc. in the second support ring. Thus, hole 1 of the first support ring is threaded and hole 1 of the second support ring, which is positionally matched and opposed to hole 1 of the first support ring, is unthreaded. Hole 2 of the first support ring is unthreaded, and the opposing hole 2 of the second support ring is threaded. This pattern is repeated around the circumference of both support rings.

Because each pin comprises only one end which is threaded, this embodiment of the invention comprises alternating the pins so that a first pin is threadingly engaged with a first support ring of the bearing assembly, a second pin is threadingly engaged with the second support ring of the bearing assembly, a third pin is again threadingly engaged to the first support ring, the fourth pin is threadingly engaged to the second support ring, and so on, in an alternating or "every-other" manner.

Each pin can comprise a shouldered end which matingly engages the support rings of the bearing assembly, wherein the support ring is countersunk to receive the shouldered end of the pin. In a preferred embodiment, the pin comprises one threaded end and one unthreaded end, and is shouldered at one or both ends. These configurations advantageously ensure the pin and bearing races are perpendicular to one another and do not skew during manufacture or while in use. A shoulder length which is greater than provided on traditional or conventional pins also adds strength to the pin. In other words, traditional and conventional pins that included a shoulder were sized to flushly meet the outer surface of the support ring, cage, or race depending on its configuration, i.e., the support ring, cage, or race was not countersunk with the shoulder of the pin; the countersinking of the pin and support ring in accordance with the subject invention allows the shoulder to be formed at a greater distance along the length of the pin and reach into and engage the countersunk support ring of the cage. This can facilitate in the assembly of the pinned roller bearing and improve performance of the bearing.

All tolerances for the pin and support ring of the subject invention are also tightened to provide accurate and precise engagements of the components, thereby eliminating any "sloppy" engagements of components whereby the engagement is not precise and accurate.

In a preferred embodiment, both support rings can be countersunk to accept the longer shouldered pin having shoulders at both ends. The countersinking of both support rings ensures they remain parallel to one another and perpendicular to the pin/roller assembly.

The end result is a bearing that has components (inner race, outer race, pins, support rings, and rollers) that are consistently perpendicular and parallel to one another as desired. This results in a bearing that runs true and without skewing or wobble and which can reduce or eliminate the axial loading or, if present, diminishes amplification of axial loading.

The subject invention can be understood by reference to the drawings. FIG. 1 is a perspective view of an embodiment of a roller bearing pin 100 according to the subject invention, illustrating the threaded first end 101 of the pin and a non-threaded second end 102 of the pin, and further illustrating the shouldered configuration 103 at both ends of the pin.

Figure 2:
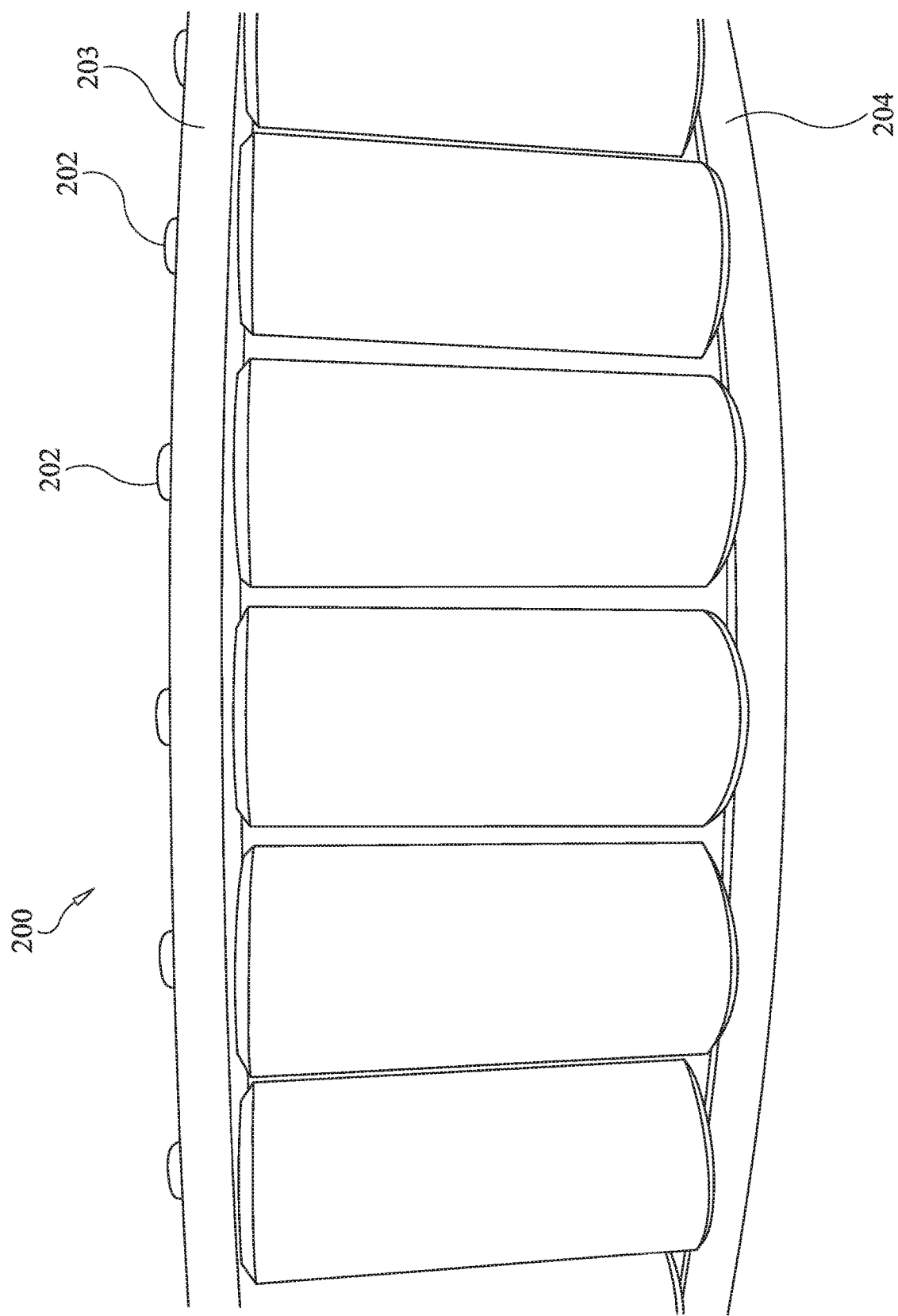
FIG. 2 shows a side elevational view of a roller bearing according to the subject invention illustrating the hot-riveted ends of the pin extending outside the bearing cages or races.

FIG. 2 shows a side elevational view of a roller bearing 200 according to the subject invention illustrating the hot-riveted ends of the pin 202 extending outside the outer surface of the support rings 203 and 204 of the bearing assemblies.

Figure 3:
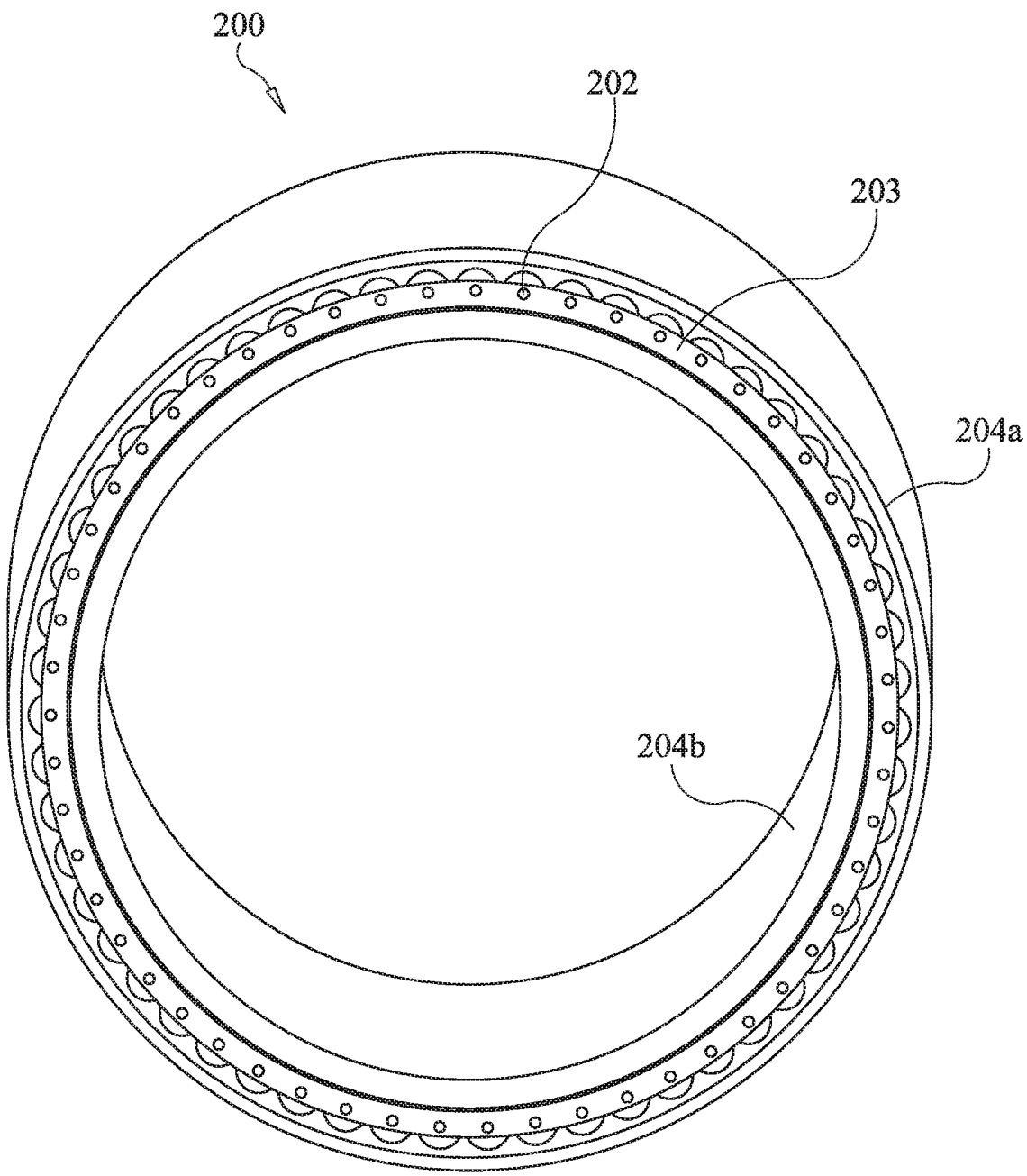
FIG. 3 is a top view of a roller bearing according to the subject invention illustrating the hot-riveted ends of the pin extending outside the bearing support ring.

FIG. 3 show a top perspective view of a roller bearing 200 according to the subject invention illustrating the hot-riveted ends of the pin 202 extending outside the outer surface of the support rings 203 and inner and outer races, respectively shown as 204a and 204b.

Figure 4:
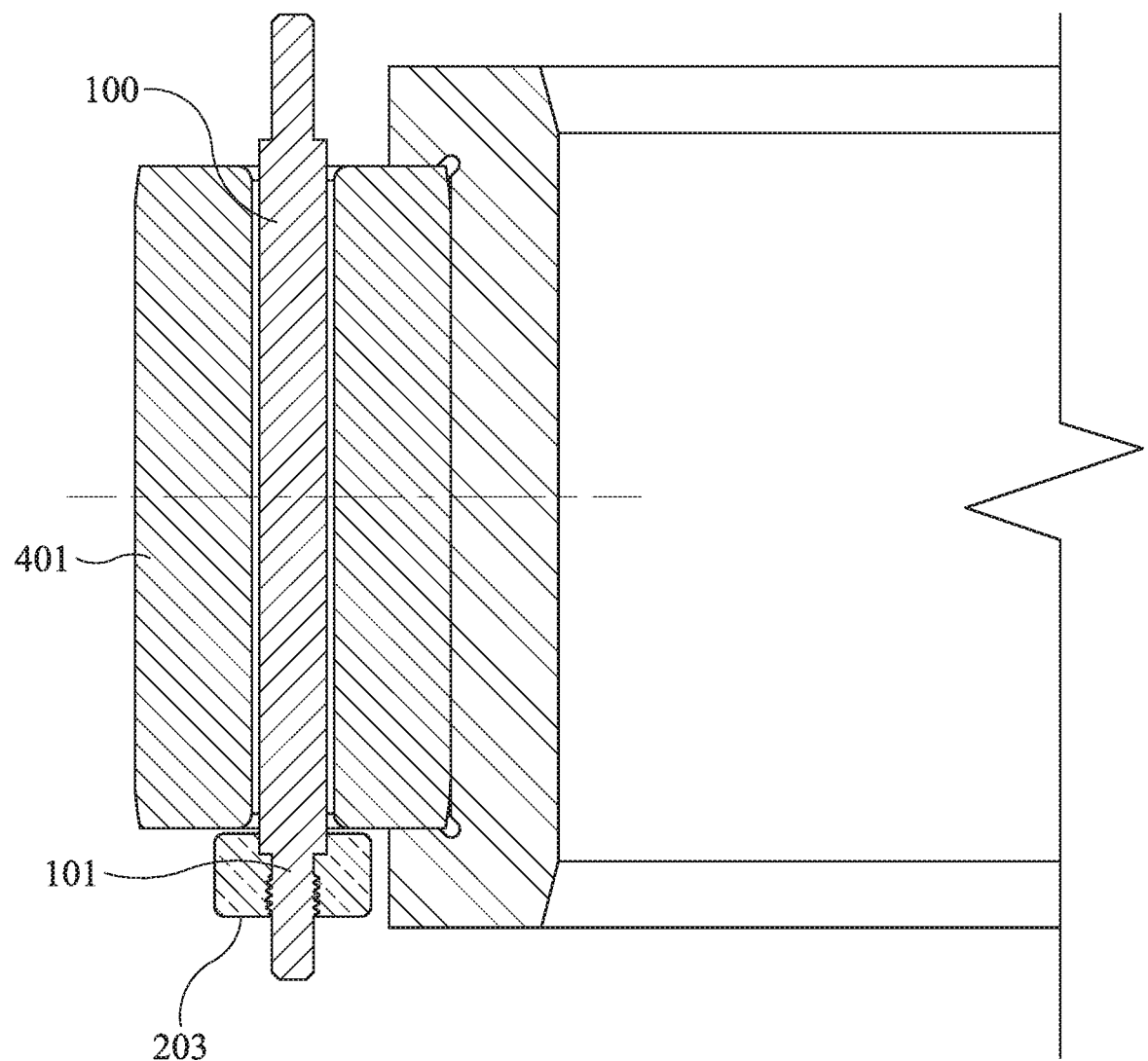
FIG. 4 shows cross-sectional view of a roller bearing pin of FIG. 1, during assembly into a roller bearing, wherein the threaded end is positioned in one of the first and second support rings of the bearing

FIG. 4 is a schematic depiction a roller bearing pin 100 as depicted in FIG. 1, in cross-section, and axially aligned within a cylindrical roller 401, wherein the pin is assembled into a roller bearing, and illustrating that the threaded end of the pin 101 is positioned and threadingly engaged with a threaded hole formed in one of the first or second support ring 203 of the bearing assembly.

Figure 5:
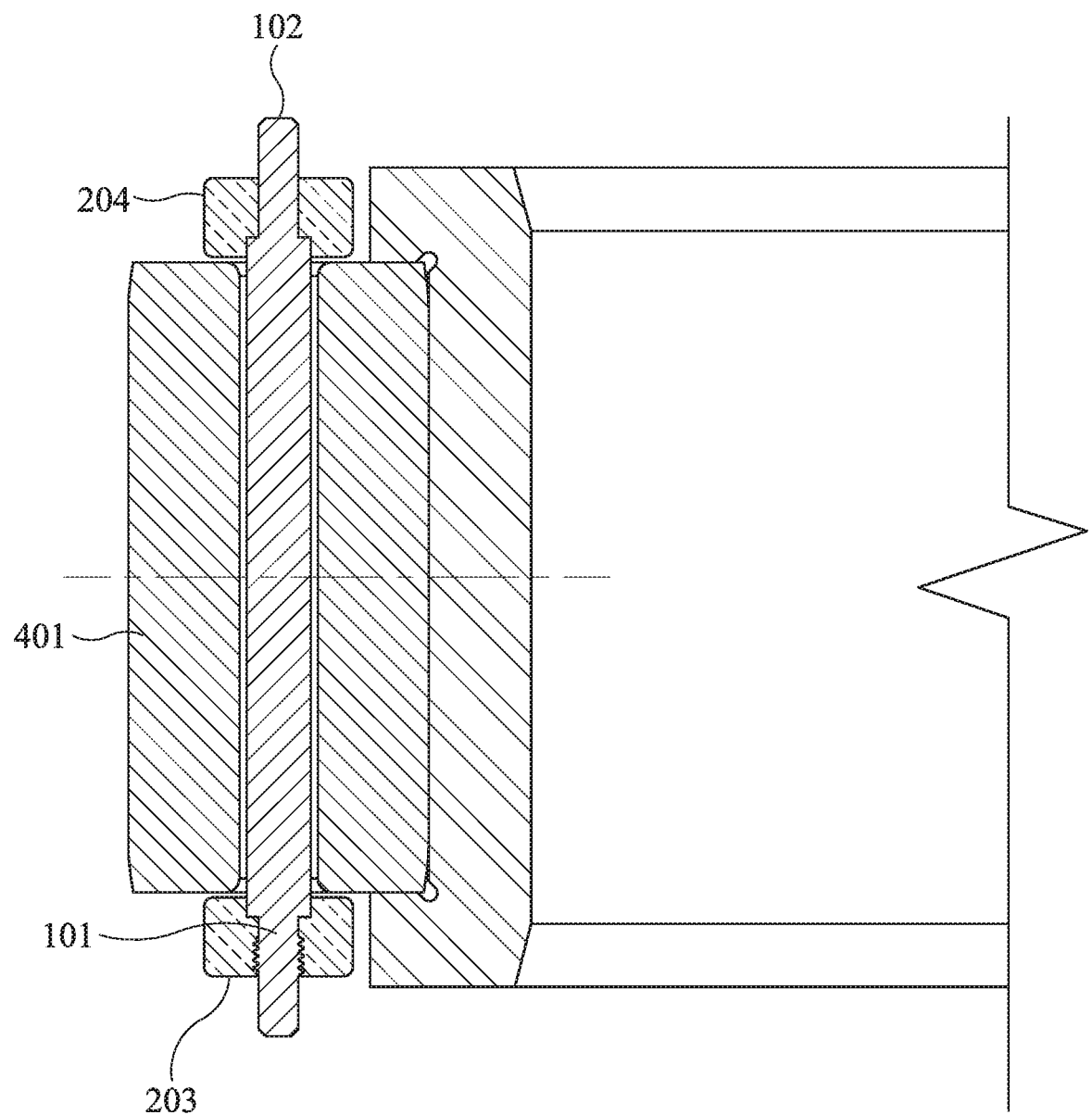
FIG. 5 shows cross-sectional view of a roller bearing pin of FIG. 1, during assembly into a roller bearing, wherein the threaded end and non-threaded end of the pin are positioned in the first and second support rings of the bearing.

FIG. 5 shows a roller bearing pin 100 as depicted in FIG. 1, in cross-section, and axially aligned within a cylindrical roller 401, wherein the pin is assembled into a first and second support ring 203 and 204 of a roller bearing assembly, illustrating that the threaded end of the pin 101 is positioned and threadingly engaged with a threaded hole formed in a first support ring 203 of a bearing assembly and the unthreaded end 102 of the pin is engaged (not threadingly) to a second support ring 204 of the bearing assembly.

Figure 6:
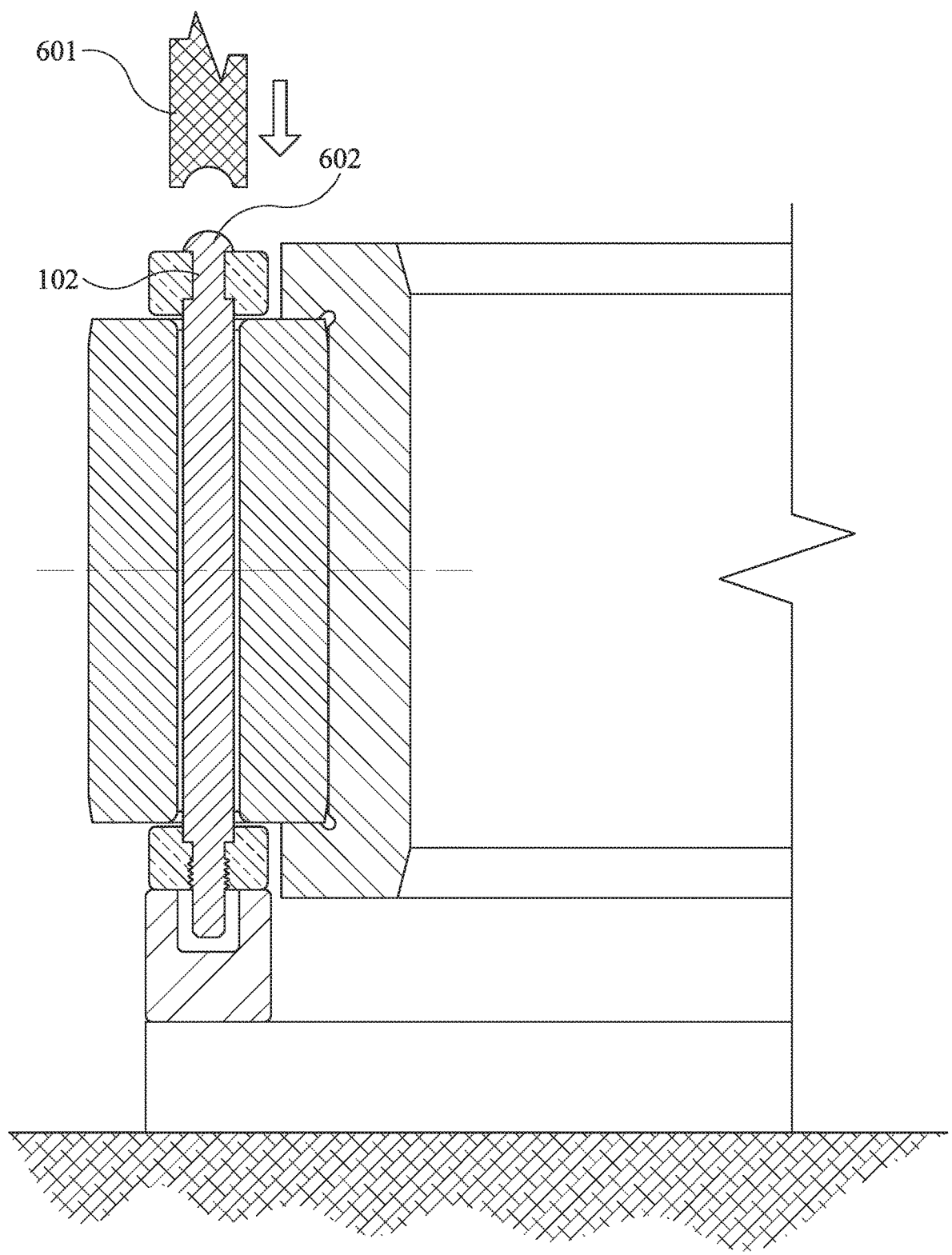
FIG. 6 shows cross-sectional view of a roller bearing pin of FIG. 5, during assembly into a roller bearing, specifically illustrating the riveting step to be performed on the non-threaded end of the pin.

FIG. 6 shows cross-sectional view of a roller bearing pin of FIG. 5 following the hot-riveting process, during the process of affixing, by hot-riveting, the pin into a support ring of a roller bearing assembly. Specifically illustrated are the riveting tool 601 which is moved or pressed downward (in the direction of the arrow) in a riveting step performed on the non-threaded end 102 of the pin to form a domed riveted end of the pin 602.

Figure 7:
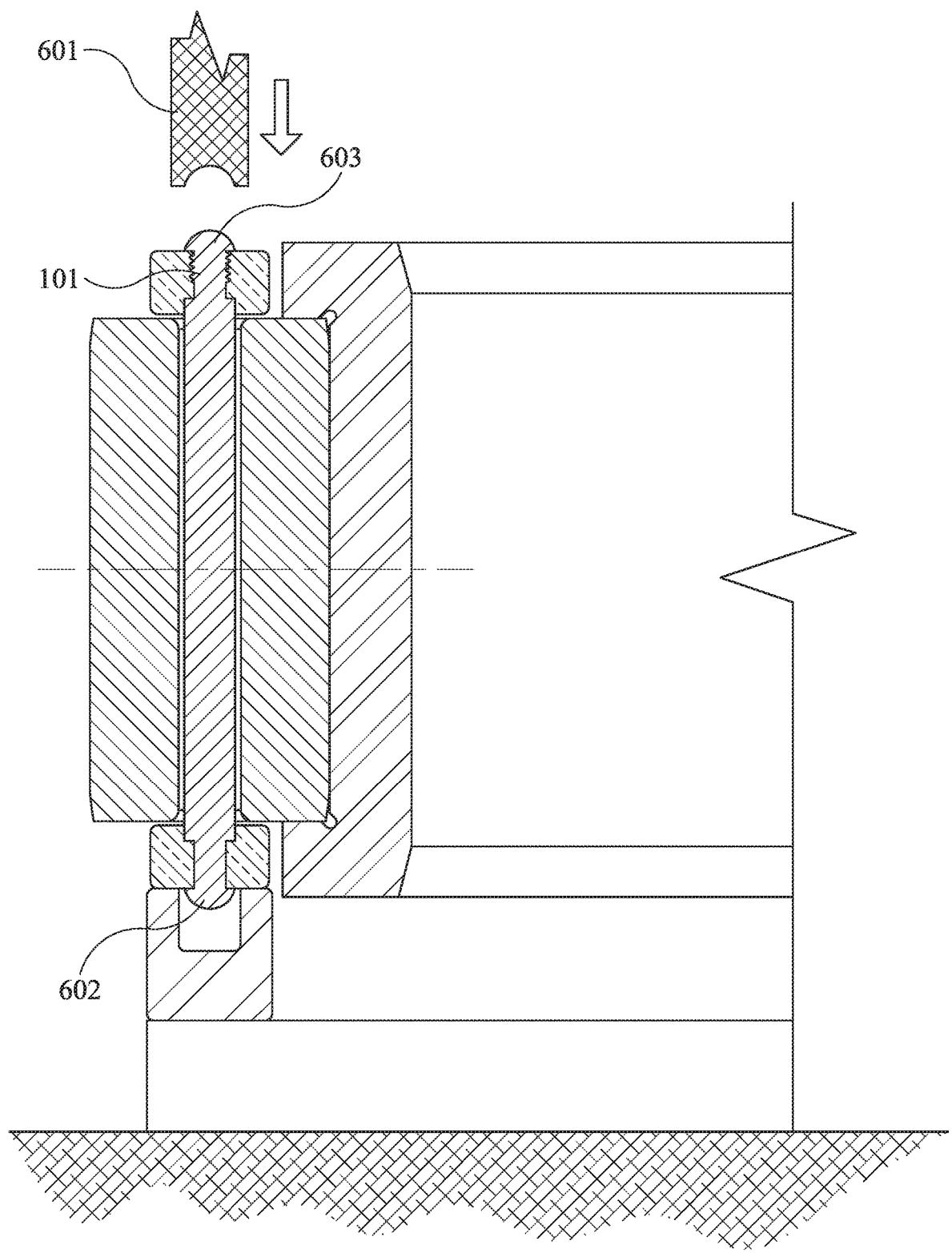
FIG. 7 shows cross-sectional view of a roller bearing pin during assembly into a roller bearing as rotated 180° from the illustration in FIG. 6, specifically illustrating the riveting step to be performed on the threaded end of the pin.

FIG. 7 shows cross-sectional view of a roller bearing pin following a hot-riveting procedure affixing the pin into a support ring of a roller bearing cage, which is depicted as rotated 180° from the illustration in FIG. 6. Specifically illustrated in FIG. 7 is the riveting tool 601 which is moved or pressed downward (in the direction of the arrow) in a riveting step performed on the threaded end 101 of the pin to form a domed riveted end of the pin 603, and resulting in the final assembled pin in the support rings of the roller bearing, as shown in cross-section in FIG. 8.

Figure 8:
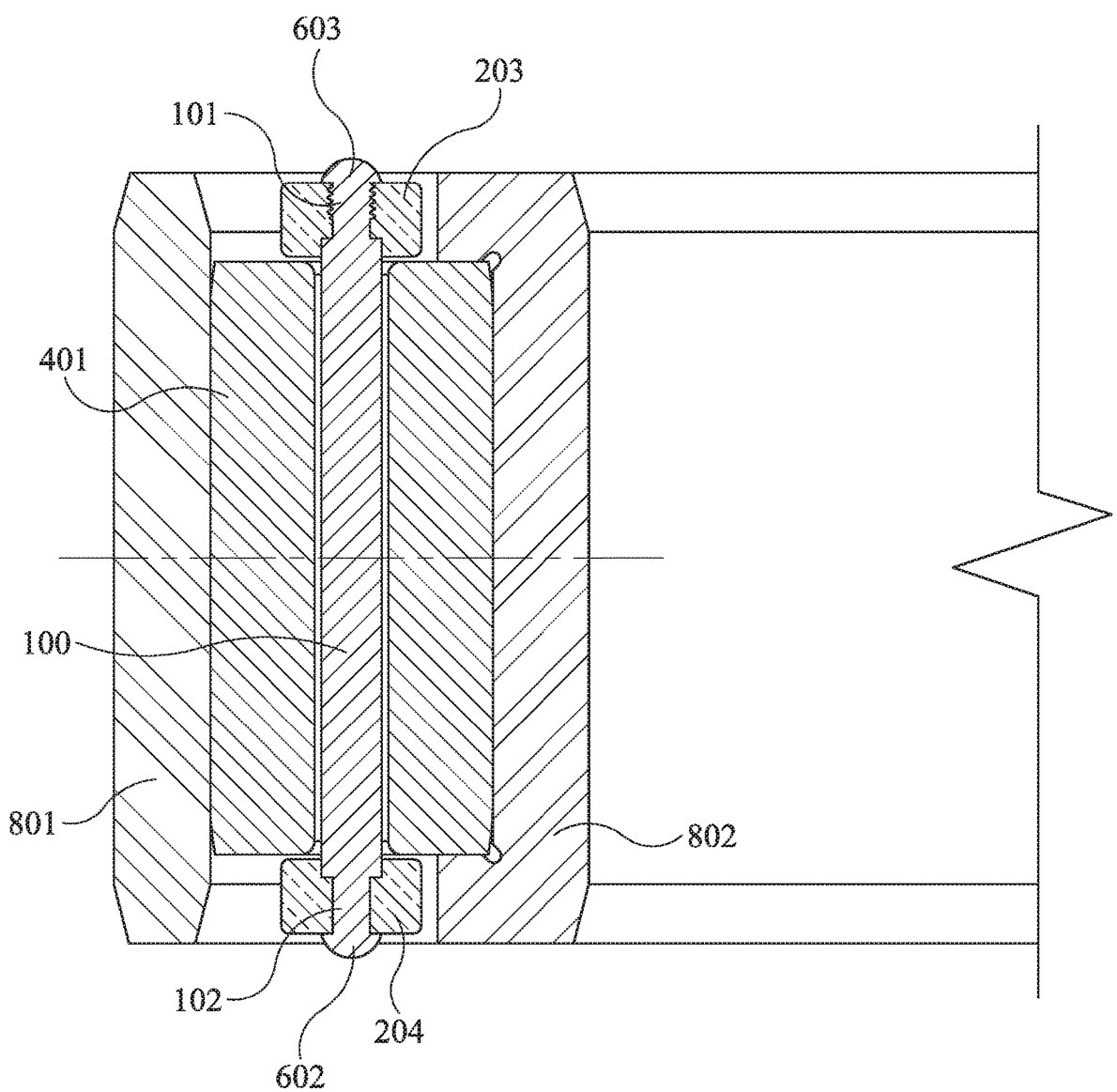
FIG. 8 shows the final assembled pin in the roller bearing.

FIG. 8 depicts the components in a threaded pin-roller assembly as assembled, and shows pin 100, having a threaded end 101 threadingly engaged in support ring 203 and hot-riveted to form a domed end 603; the pin further having an unthreaded end 102 unthreadeingly engaged in a second support ring 204 and hot-riveted to form a domed pin end 602, wherein the pin 100 is disposed through the center axis of a cylindrical roller 401, and wherein the pinned roller is assembled between a first race 801 and a second race 802 to form the threaded pin roller bearing assembly.

Figure 9:
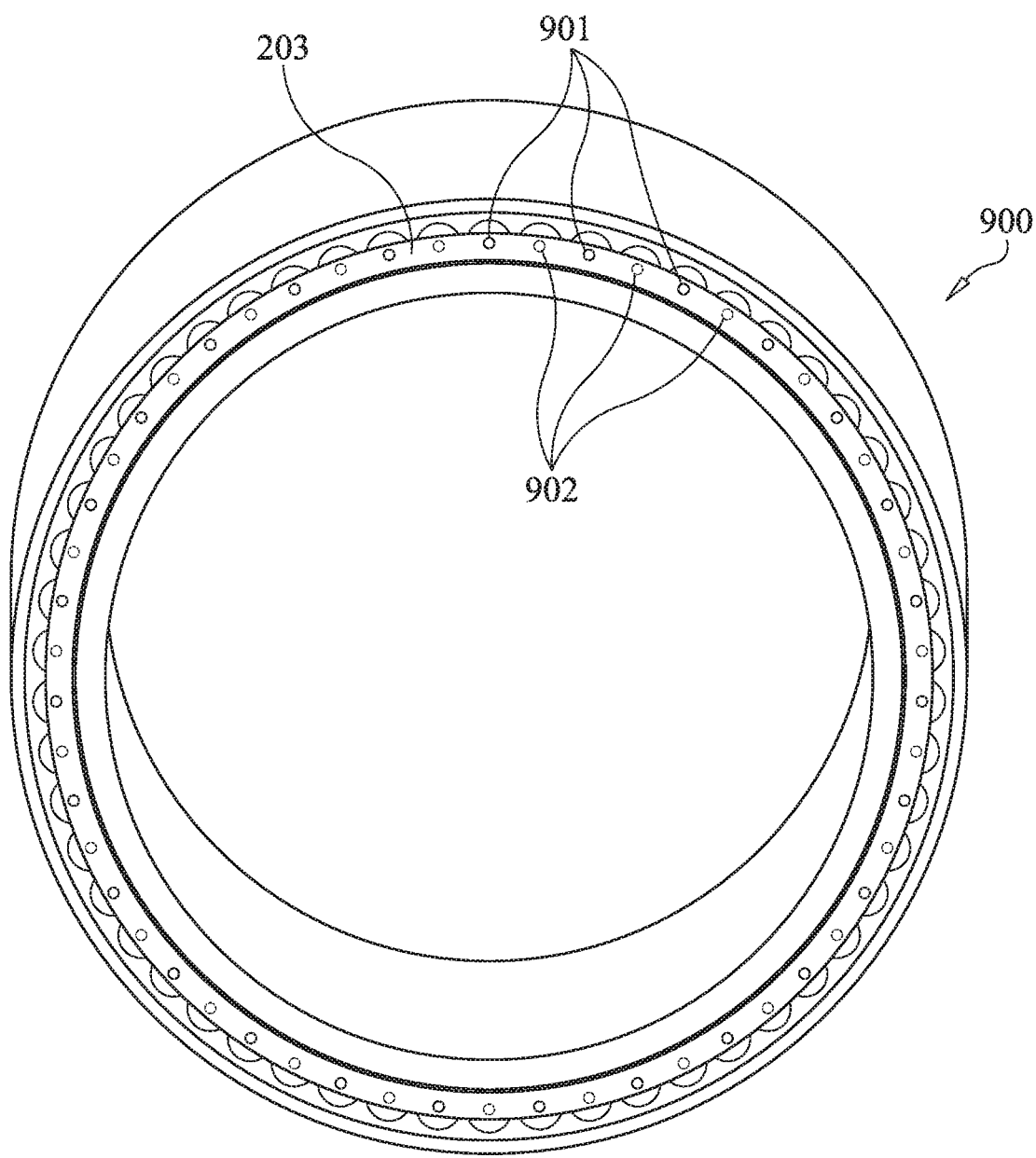
FIG. 9 shows a front elevational view of a roller bearing according to the subject invention, illustrating a first support ring having alternating (every other) threaded holes for receiving a threaded end of a roller bearing pin, and wherein the other holes in the first support ring are unthreaded.

FIG. 9 shows a front perspective view of an assembled roller bearing 900 according to the invention, which illustrates first support ring 203 configured to comprise threaded holes in an alternating configuration for receiving a threaded end of a roller bearing pin in every other, e.g., odd-numbered, hole. Shown here are threaded holes 901 and unthreaded holes 902 in the first support ring 203.

Figure 10:
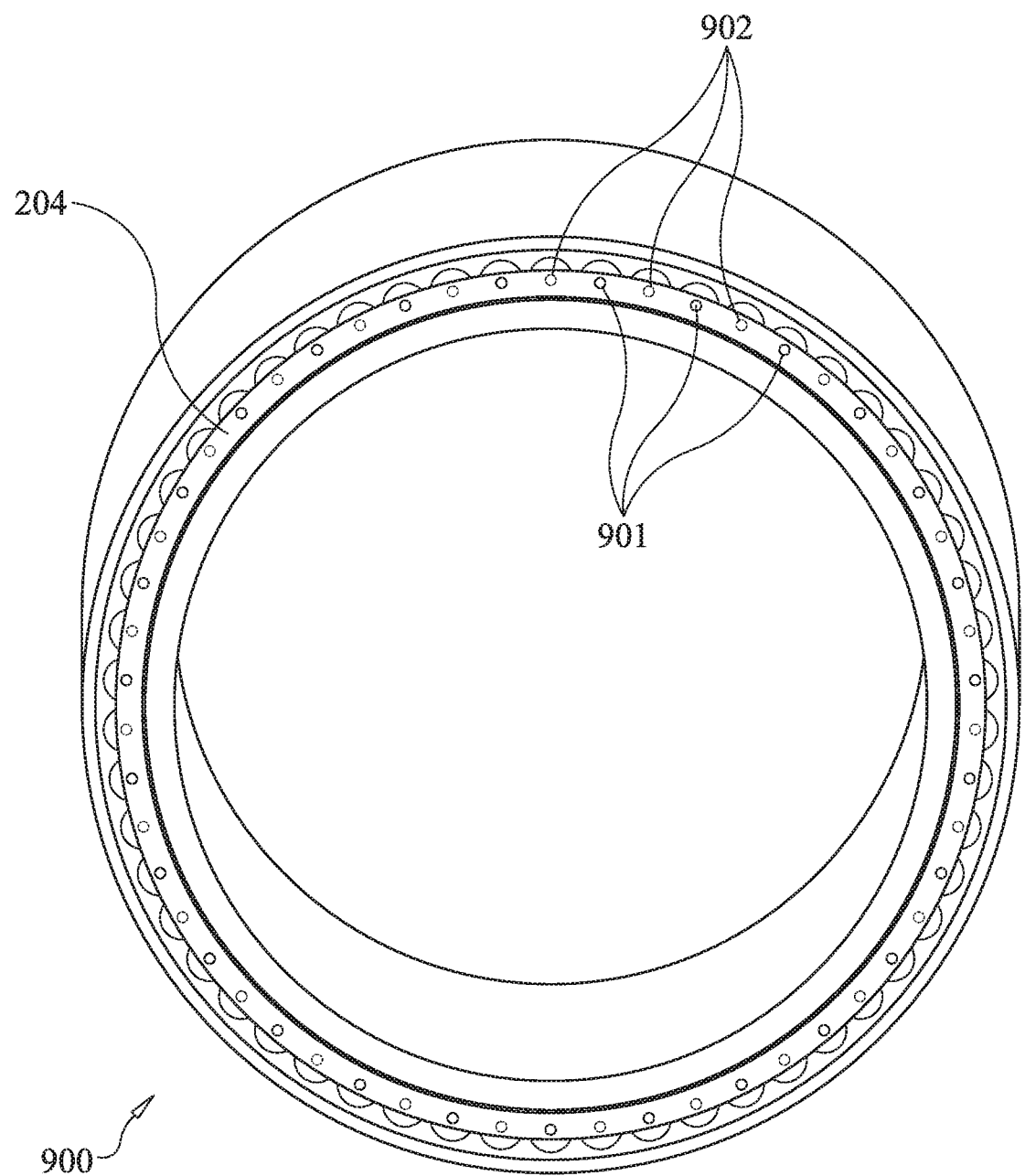
FIG. 10 shows a back elevational view of a roller bearing according to the subject invention, illustrating a second support ring having alternating (every other) threaded holes for receiving a threaded end of a roller bearing pin, wherein the threaded holes align with the unthreaded holes in the first support ring.

FIG. 10 shows a back perspective view of an assembled roller bearing according to the invention, which illustrates second support ring 204 configured to comprise threaded holes in an alternating configuration for receiving a threaded end of a roller bearing pin in every other, e.g., even-numbered, hole. Shown here are threaded holes 902 and unthreaded holes 901 in the second support ring 204.

The Figures can also be useful for understanding the process for manufacture and assembly of the pin and roller bearing of the invention, which is described as follows:

Steps 1 through 4 are generally illustrated in FIG. 4. Step 5 is generally illustrated in FIG. 5. Steps 6 through 12 are illustrated generally in FIG. 6. Step 13 is generally illustrated in FIG. 7, and Step 14 is generally illustrated in FIG. 8.

Step 1: Three (3) short metal blocks are placed on the table. The inner-race (802 in FIG. 8 and correspondingly shown in FIG. 4) is then placed on the blocks elevating it off the table surface.

Step 2: The threaded support ring 203 is placed over the inner-race.

Step 3: One (1) roller 401 is placed into the inner-race groove and is held in place by hand. One (1) roller pin 100 is then inserted through the held roller and threaded into the support ring 203 by hand. This process is repeated at 180 degrees, 90 degrees and 270 degrees around the circumference of the support ring 203. This process is repeated until all rollers and pins are installed.

Step 4: A drill motor (not shown) is used to tighten each roller pin threadingly engaged into the support ring to ensure the pin fully shoulders into the the countersunk support ring. The process is performed for the threaded holes at 0 degrees, 180 degrees, 90 degrees then 270 degrees around the circumference of the support ring until all pins are threadingly tightened. This ensures the pins are perpendicular to the support rings, and properly aligned in the inner-race. This can be critical to the bearing running "true" after the bearing is fully assembled.

Step 5: The non-threaded support ring 204 is installed onto the exposed unthreaded end 102 of the pins with the countersunk side down. The support ring is slightly tapped into place with a rubber mallet until the support ring is fully shouldered against each roller pin. At this stage of assembly, the result is an inner-race roller assembly, without an outer race being part of the assembly.

Step 6: The inner-race roller assembly is moved to the pin press and hot-riveted. The inner-race is installed on the support ring with the threaded support ring side down.

Step 7: The hot-rivet press head 601 is brought down to align with the exposed roller pin. The hot-rivet press head is then energized and the exposed roller pin is heated until it glows red. The press head is then compressed fully against the cage surface and the domed pin head 602 is formed.

Step 8: The roller assembly is rotated 180° and step 7 is repeated.

Step 9: The roller assembly is rotated 90° and step 7 is repeated.

Step 10: The roller assembly is rotated 180° and step 7 is repeated.

Step 11: The roller assembly is rotated to the roller pin adjacent to the starter pin in step 7. Step 7 is repeated, Step 8 is repeated, Step 9 is repeated and Step 10 is repeated.

Step 12: Step 11 is repeated until all pins are pressed.

Step 13: The roller assembly is flipped over and Steps 7 through 12 are performed on the threaded end 101 of the roller pin until all pins are pressed.

Step 14: The roller assembly is removed from the press machine and the outer-race is installed over the inner-roller assembly to complete the bearing assembly.

In the alternative embodiment having every other hole in first and second support rings threaded, half of the threaded pins are threadingly placed in the threaded holes of the first support ring, and the other half of the threaded pins are threadingly placed in the second support ring. The support rings are brought together so that the pins in each support ring are aligned in the alternating configuration, such that the unthreaded ends are disposed into the unthreaded holes of the opposing support ring. The inner and outer races of the bearing assembly are positioned and installed into place such that the bearing assembly is in final, assembled configuration, then each of the ends of the pins are hot-riveted into place as described above.

The hot riveting process can be advantageous in preventing warping of the pins or other components forming the bearing assembly. Cold-riveting (at approximately room temperature) can cause the rivet formation to be non-uniform, can bend the roller pin tip instead of creating a pin head, and produce undesired strain on the pin when in use. Welding temperatures can cause the pins to become brittle. Accordingly, a hot riveting process used on the pins at temperatures between 1,200° F. and 1,750° F. is preferred, and use of temperatures of 1,730° F. or below, down to about 1,200° F. are most preferred.

The specification is for illustration purposes and is not limiting. Other embodiments and modifications to the invention readily understood by persons of ordinary skill in the art are intended to be within the scope of the invention and claims.

The invention claimed is:

1. A pinned cylindrical roller bearing comprising:
a cylindrical roller which moves within an inner and outer race, and a pin disposed through an axial length of the cylindrical roller, wherein the pin comprise a first end and a second end each affixed to a support ring on each side of the bearing and between the inner and outer race, and wherein one of said first end or second end is threaded and the other of said first end or second end is unthreaded, wherein the pin is threadingly engaged with a threaded aperture formed in a first support ring and the unthreaded end is unthreadingly engaged to an unthreaded aperture formed in a second support ring, wherein the first and second ends of the pin are domed ends outside the support ring to which it is engaged, and wherein the domed ends are formed by hot-riveting the first and second ends of the pin.

2. The pinned cylindrical roller bearing of claim 1, wherein the pin comprises a shoulder at each end which countersinks with a countersunk aperture formed in the first and second support rings.

3. The pinned cylindrical roller bearing of claim 1, wherein the pin is a plurality of pins.

4. The pinned cylindrical roller bearing of claim 1, wherein the pin is a plurality of pins threaded on one end of the pins, wherein a first pin of the plurality of pins is threadingly engaged with a first support ring and unthreadingly engaged to a second support ring, and a second pin of the plurality of pins immediately proximate to the first pin is threadingly engaged to the second support ring and unthreadingly engaged to the first support ring, and all of the plurality of pins are alternatingly threadingly engaged with one of the first and second support rings.

5. A pinned cylindrical roller bearing comprising:
a plurality of cylindrical rollers having axial bores therethrough for receiving a pin within each cylindrical roller;
a plurality of pins, each pin comprising a first threaded end and a second unthreaded and shouldered end;
a first and second support ring, each support ring comprising a plurality of apertures configured to receive the first threaded end or second unthreaded end of one of the plurality of the pins, said apertures being evenly spaced and alternatingly being threaded or unthreaded for matingly receiving a respective threaded end or unthreaded end of the pin; and
an inner bearing race and an outer bearing race, wherein the pinned roller bearing is formed by a process comprising the steps of:

threadingly engaging the threaded ends of the pins into the alternatingly threaded apertures of the first support ring;

threadingly engaging the threaded ends of the pins into the alternatingly threaded apertures of the second support ring;

positioning the rollers over each of the pins;

mating the unthreaded ends of the pins threadingly positioned in the first support ring to the unthreaded apertures in the second support ring and mating the unthreaded ends of the pins threadingly positioned in the second support ring to the unthreaded apertures in the first support ring;

hot-riveting each end of the plurality of pins after threadingly engaging and unthreadingly mating ends of the pins to form domed ends on the pins; and placing the inner race and outer race in position in relation to the rollers.

* * * * *